US007958278B2

(12) United States Patent
Takada et al.

(10) Patent No.: US 7,958,278 B2
(45) Date of Patent: Jun. 7, 2011

(54) IMAGE FORMING APPARATUS, JOB EXECUTION APPARATUS, AND JOB EXECUTION METHOD

(75) Inventors: Akihito Takada, Toyohashi (JP); Masazumi Ito, Toyohashi (JP); Syuji Maruta, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 357 days.

(21) Appl. No.: 11/020,250

(22) Filed: Dec. 27, 2004

(65) Prior Publication Data

US 2006/0085567 A1    Apr. 20, 2006

(30) Foreign Application Priority Data

Oct. 14, 2004  (JP) ................................. 2004-300499

(51) Int. Cl.
  *G06F 3/00*   (2006.01)
  *G06F 13/00*  (2006.01)
  *G06F 3/12*   (2006.01)
  *G06F 9/46*   (2006.01)
  *G06K 15/00*  (2006.01)
  *H04N 1/04*   (2006.01)

(52) U.S. Cl. .................. 710/20; 710/8; 710/13; 710/15; 710/33; 710/52; 358/1.13; 358/1.15; 358/1.16; 358/474; 718/105

(58) Field of Classification Search ........................ None
See application file for complete search history.

(56) References Cited

U.S. PATENT DOCUMENTS

| 5,363,212 | A  | * | 11/1994 | Taniuchi et al. ............. 358/452 |
| 5,768,483 | A  | * | 6/1998  | Maniwa et al. ............. 358/1.15 |
| 5,923,437 | A  | * | 7/1999  | Itoh .............................. 358/401 |
| 6,370,268 | B2 | * | 4/2002  | Baba et al. ................... 382/154 |
| 6,863,455 | B2 |   | 3/2005  | Blom et al. |
| 7,061,641 | B2 | * | 6/2006  | Hirai ............................. 358/1.18 |
| 7,079,268 | B1 | * | 7/2006  | Tanaka ......................... 358/1.15 |
| 7,106,461 | B2 |   | 9/2006  | Kakigi et al. |
| 7,158,244 | B2 |   | 1/2007  | Sommer et al. |
| 7,266,643 | B2 | * | 9/2007  | Torii ............................. 711/118 |
| 7,310,156 | B2 |   | 12/2007 | Watanabe et al. |

(Continued)

FOREIGN PATENT DOCUMENTS

JP         10-226117         8/1998

(Continued)

OTHER PUBLICATIONS

Microsoft Computer Dictionary (Fifth Edition). Redmond, WA: Microsoft Press, 2002, p. 433.*

(Continued)

*Primary Examiner* — Tariq Hafiz
*Assistant Examiner* — Henry Yu
(74) *Attorney, Agent, or Firm* — Morrison & Foerster LLP

(57) ABSTRACT

An image forming apparatus includes a job execution portion, a connecting portion for detachably connecting an external storage, a detection portion for detecting connection to the connecting portion of the external storage, a stored information reading portion for reading stored information of the external storage based on connection detection of the external storage by the detection portion, an internal storage portion for storing the read stored information, and a job administration portion for making the job execution portion execute a job about the stored information stored in the internal storage portion and for registering the job about the stored information as a processing wait job when the job execution portion is executing another job.

21 Claims, 11 Drawing Sheets

U.S. PATENT DOCUMENTS

| | | |
|---|---|---|
| 7,312,882 B2 * | 12/2007 | Hino et al. .................... 358/1.13 |
| 2002/0039195 A1 * | 4/2002 | Miyake ........................ 358/1.15 |
| 2002/0135792 A1 * | 9/2002 | Sommer et al. ............. 358/1.13 |
| 2002/0135816 A1 * | 9/2002 | Ohwa ............................ 358/474 |
| 2004/0169760 A1 * | 9/2004 | Furukawa ................ 348/333.12 |
| 2005/0071520 A1 * | 3/2005 | Hull et al. .......................... 710/8 |
| 2005/0195435 A1 * | 9/2005 | Kojima et al. ............... 358/1.16 |
| 2006/0061823 A1 * | 3/2006 | Riesel et al. ................. 358/1.16 |

FOREIGN PATENT DOCUMENTS

| | | |
|---|---|---|
| JP | 10-336375 | 12/1998 |
| JP | 2001-26169 | 1/2001 |
| JP | 2001-147481 | 5/2001 |
| JP | 2001-175448 | 6/2001 |
| JP | 2001-213027 | 8/2001 |
| JP | 2001-282477 | 10/2001 |
| JP | 2001-298685 | 10/2001 |
| JP | 2002-27179 | 1/2002 |
| JP | 2002-113930 | 4/2002 |
| JP | 2002-142058 | 5/2002 |
| JP | 2002-326404 | 11/2002 |
| JP | 2002-342046 | 11/2002 |
| JP | 2002-356020 | 12/2002 |
| JP | 2003-25692 | 1/2003 |
| JP | 2003-127508 | 5/2003 |
| JP | 2004-62524 | 2/2004 |
| JP | 2004-86664 | 3/2004 |
| JP | 2004-090515 | 3/2004 |
| JP | 2004-090632 | 3/2004 |
| JP | 2004-118313 | 4/2004 |
| JP | 2004-148695 | 5/2004 |
| JP | 2004-254176 | 9/2004 |
| JP | 2004-287792 | 10/2004 |

OTHER PUBLICATIONS

Japanese Notification of Reasons for Refusal dated Feb. 6, 2007, directed to related JP application No. 2004-300499.

Japanese Notification of Reasons for Refusal mailed Feb. 8, 2011, directed to counterpart Japanese Patent Application No. 2004-300499; 16 pages.

* cited by examiner

IMAGE FORMING APPARATUS, JOB EXECUTION APPARATUS, AND JOB EXECUTION METHOD

This application claims priority under 35 U.S.C. §119 to Japanese Patent Application No. 2004-300499 filed on Oct. 14, 2004, the entire disclosure of which is incorporated herein by reference in its entirety.

BACKGROUND OF THE INVENTION

1. Field of the Invention

The present invention relates to a job execution apparatus and method that executes a job by reading stored information stored in an external storage, such as a USB (Universal Serial Bus) memory, when such external storage is connected.

2. Description of the Related Art

The following description sets forth the inventor's knowledge of related art and problems therein and should not be construed as an admission of knowledge in the prior art.

Conventionally, Japanese Unexamined Laid-open Patent Publication No. 2003-127508, etc., proposes a printing system. According to this system, when a memory card including print setting information and an image data file is inserted in order to print the image data stored in the memory card, the contents of the image data are read and the image is off-line printed under the specified settings.

Furthermore, Japanese Unexamined Laid-open Patent Publication No. 2004-90632 proposes a printing method. In this method, at the time of setting of a print job, image data is read from a memory card. This image and its job number are displayed. The input of the number of prints is accepted while they are being displayed. After the input, when a selection button is pushed, the identification information and the print number of the image on display are set up as one print job. When an execution button is pushed, the set print job is written in a memory card, the image data and the print job are read from the memory card, and the image is printed in order of the job number.

However, in any publications including the aforementioned publications disclosing conventional systems, there was no disclosure on how to treat a read job in cases where a job is stored in a memory card and when this job is read a job execution portion is executing another job.

Moreover, complicated operation was required until the execution of the job.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide an image forming apparatus capable of assuredly executing a job about stored information read from an external memory without requiring complicated operations even if another job is being executed.

Among other potential advantages, some embodiments can provide a job execution method capable of assuredly executing a job about stored information read from an external memory without requiring complicated operations even if another job is being executed.

According to a first aspect of the preferred embodiment of the present invention, an image forming apparatus, comprises:

a job execution portion;

a connecting portion for detachably connecting an external storage;

a detection portion for detecting connection to the connecting portion of the external storage;

a stored information reading portion for reading stored information of the external storage based on connection detection of the external storage by the detection portion;

an internal storage portion for storing the read stored information; and a job administration portion for making the job execution portion execute a job about the stored information stored in the internal storage portion and for registering the job about the stored information as a processing wait job when the job execution portion is executing another job.

According to a second aspect of the preferred embodiment of the present invention, a job execution apparatus, comprises:

a job execution portion;

a connecting portion for detachably connecting an external storage;

a detection portion for detecting connection to the connecting portion of the external storage;

a stored information reading portion for reading stored information of the external storage based on connection detection of the external storage by the detection portion;

an internal storage portion for storing the read stored information; and a job administration portion for making the job execution portion execute a job about the stored information stored in the internal storage portion and for registering the job about the stored information as a processing wait job when the job execution portion is executing another job.

According to a first aspect of the preferred embodiment of the present invention, a job execution method, comprises:

a step of detecting connection of an external storage to a connecting means for detachably connecting the external storage;

a step of reading stored information of the external storage based on connection detection of the external storage by the detection step;

a step of storing the read stored information in a storage means;

a step of executing a job about the stored information stored in the storage means; and a step of registering the job about the stored information as a processing wait job when another job is being executed in the executing step.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

[Entire MFP Structure]

Figure 1:
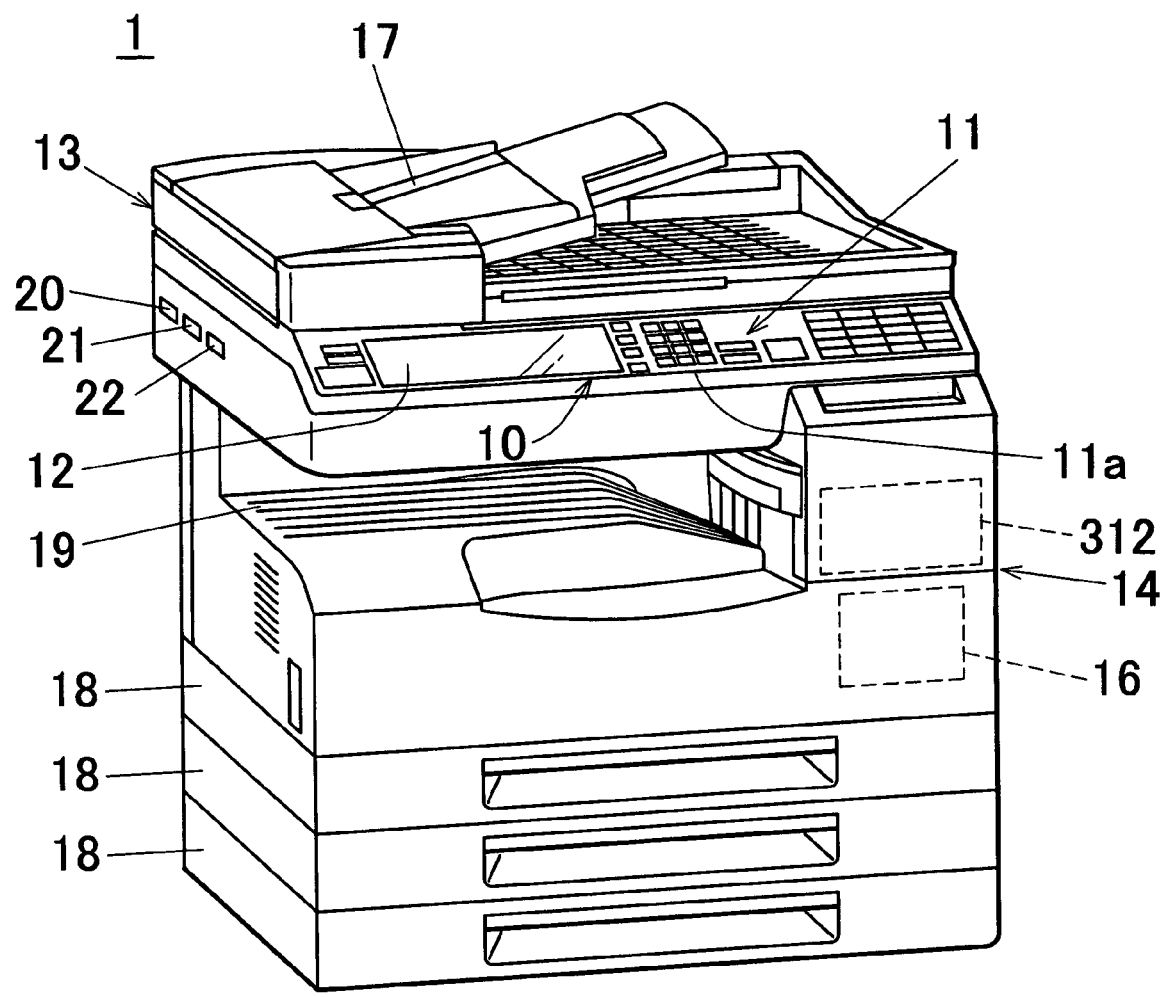
FIG. 1 is a perspective view showing a MFP to which a memory information processing apparatus for external storages according to an embodiment of the present invention is applied.

FIG. 1 is a perspective view showing a MFP as an image forming apparatus to which a job execution apparatus according to one embodiment of the present invention is applied.

Figure 2:
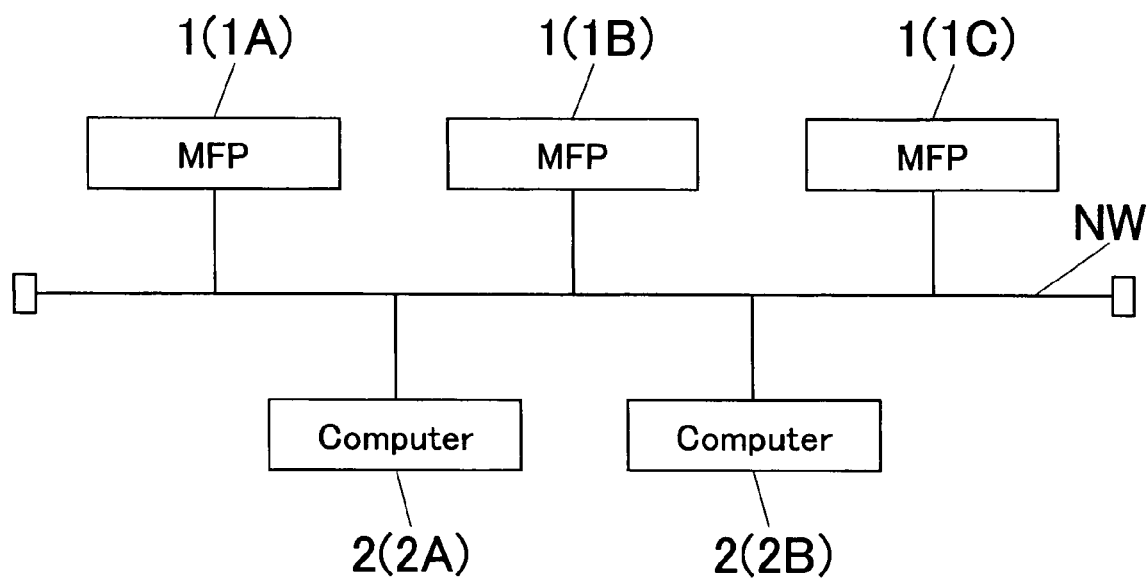
FIG. 2 is a block diagram showing a network environment of the MFP.

In FIG. 1, the MFP 1, which is one of image forming apparatuses, is a digital complex machine having a copy function, a print function, a facsimile function, a scanner function, etc., and is capable of transmitting and receiving data between user terminals, etc. via a network NW (see FIG. 2).

The MFP 1 has insertion ports 20, 21 and 22 as connecting portions to which a plurality of (three in this embodiment) USB standardized external equipments are connected. When external equipments each having a USB interface, such as USB memories 320, 321 and 322 (see FIG. 3) which are external storages, are connected to the insertion ports 20, 21 and 22, data transmission and reception becomes possible between the external equipments and the MFP 1. Hereafter, the insertion port 20, 21 and 22 will be referred to as a "USB port" or "USB connector."

The MFP 1 is provided with a control panel 10. This control panel 10 has a plurality of keys 11a, an operation portion 11 which receives various kinds of instructions made by user operations to the keys 11a or entries of data, such as characters and numbers, a display 12 made of liquid crystal which displays instructions menu to users or information about the acquired image, etc.

The MFP 1 is provided with a scanner portion 13 which reads an original document optically to obtain the image data, and a printer portion 14 which prints an image on a record sheet based on the image data.

On the upper surface of a main body of the MFP 1, a feeder portion 17 for sending an original document to the scanner portion 13 is provided. At the lower portion, a paper feeding portion 18 for supplying recording sheets to the printer portion 14 is provided. Further provided at the central portion are a tray 19 on which the recording sheet on which an image was printed by the printer portion 14 is discharged. Furthermore, provided in the interior of the main body of the MFP 1 are a communication portion 16 for transmitting and receiving image data, etc. between the MFP and external equipments via a network NW, and a storage portion 312 which stores image data, etc.

The MFP 1 has a network interface, so that the communication portion 16 is connected to the network NW via the network interface so as to be able to exchange various data between the MFP and external equipments.

The display 12 is used to display various information including destination lists of data transmission. The operation portion 11 is used for various inputs including a selection of destination by a user. They function as a principal part of the user interface.

The scanner portion 13 acquires image data by photoelectrically reading image information, such as photographs, characters, pictures, from an original document. The acquired image data (concentration data) is changed into digital data in the image processing portion (not illustrated), and subjected to various well-known image processing. Thereafter, the processed data is sent to the printer portion 14 or the communication portion 16 to be printed or transmitted, or stored in a storage portion (not illustrated) for the next use.

The printer portion 14 prints an image on a recording sheet based on image data acquired by the scanner portion 13, image data received from an external equipment by the communication portion 16, or image data stored in the storage portion (not illustrated).

The communication portion 16 transmits and receives facsimile data via a dial-up line, and also transmits/receives data via networks NW, such as LANs and the Internet, by using an E-mail, etc.

Thus, the MFP 1 has not only a function as a facsimile apparatus for performing a usual facsimile communication but also a function as a transmitting/receiving terminal of an E-mail. Therefore, various image data can also be transmitted and received as an attached file of an E-mail. The network communication that the MFP 1 performs can be made by wire or radio. In the illustrated embodiment, a wire communication mode is adopted.

[Outline of Network]

FIG. 2 is an explanatory view showing an example of a network connection according to one embodiment of the present invention.

In FIG. 2, the network NW is constituted by personal computers (hereinafter also referred to as "PC") 2 (2A, 2B, . . . ) as a plurality of external equipments (terminals) which requires printing processing as a job, and a plurality of MFPs 1 (1A, 1B, 1C . . . ) which perform the aforementioned job. Here, it is supposed that each MFP 1 has a multi-job function.

The multi-job function means, in an image forming apparatus, such as a digital copier and a printer, which performs image formation using digitized image data, a function to be used for forming an image by digitally processing image data read using an image reader, etc., or a function capable of forming an image using image data transmitted from an external terminal of the PC 2 or the like connected to an image forming apparatus. A function which can acquire image data while performing image formation is also one of multi-job functions.

In an image forming apparatus having a multi-job function, an image formation using image data obtained from a bunch of original documents read by an image reader, an image formation using image data transmitted from PCs, or image data read from USB memories 320, 321 and 322, are treated as a single job, respectively. And the image formation is performed as a job unit in order.

That is, image data obtained by reading an original document, image data transmitted from a PC and an image data read from a USB memory are stored in an image memory with corresponding job identifier (hereinafter "Job ID") of each job, while the job ID is registered into a predetermined administration table in order that each job was issued to the image forming apparatus. Then, image formation is performed in order of the job ID registered in the table.

[Electric Structure of the MFP 1]

Figure 3:
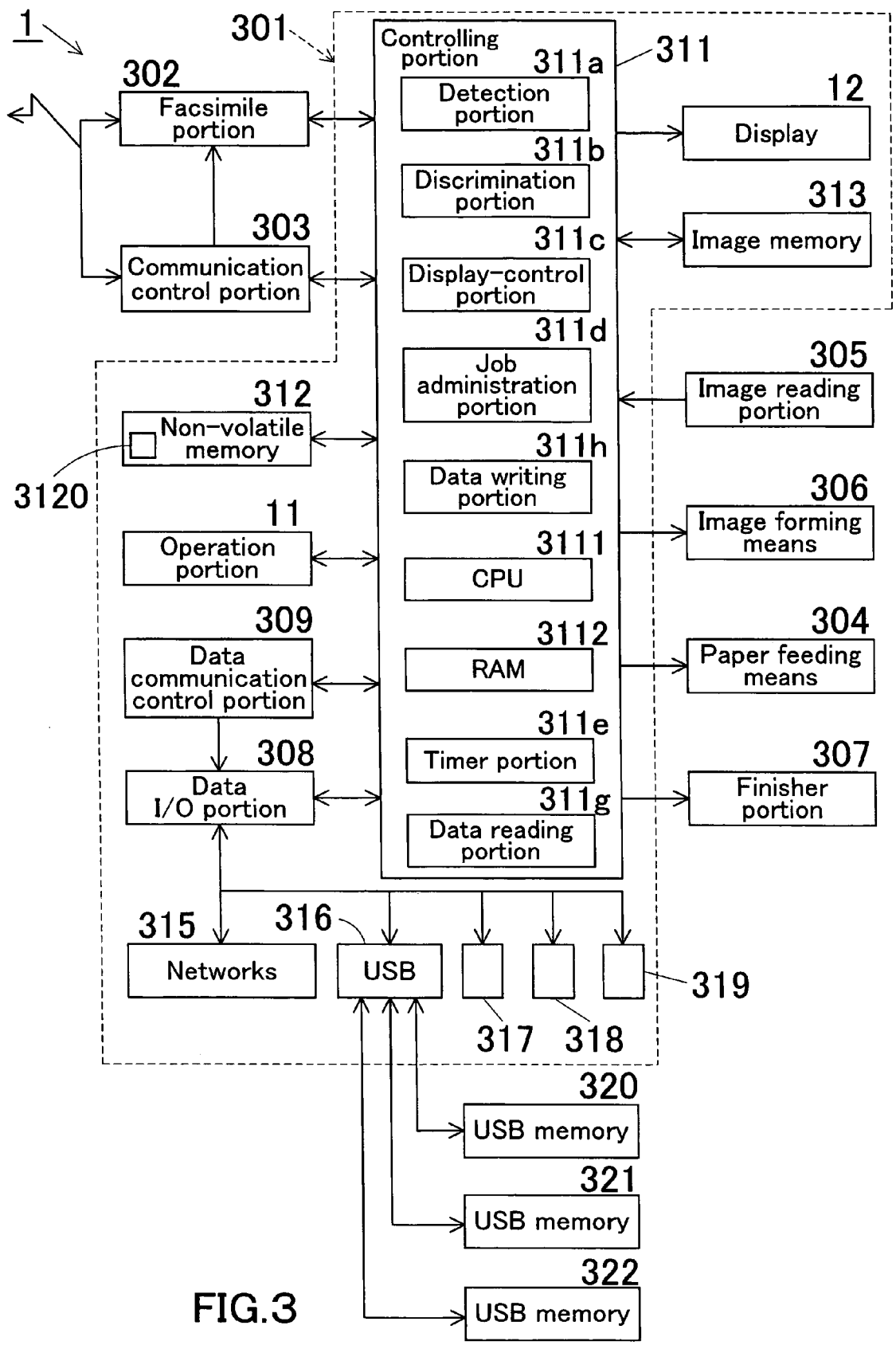
FIG. 3 is a block diagram showing an electric structure of the MFP.

FIG. 3 is a block diagram showing an electric structure of the MFP 1.

In FIG. 3, this MFP 1 has an information processing portion 301, a facsimile portion 302, a communication control portion 303, a paper-feeding portion 304, an image reading portion 305 that constitutes the scanner portion 13, an image formation portion 306 which constitutes the printer portion 14, and a finisher portion 307.

The image reading portion 305 reads an original document to the image data, and the image formation portion 306 forms an image corresponding to the image data and performs sheet printing. The facsimile portion 302 performs a facsimile transmission or receives the image data. The communication control portion 303 transmits data and/or mails to a predetermined destination, or receives print data, etc., from an external equipment of user PCs 2, etc., and functions as one of job execution portions.

This information processing portion 301 is an example of an information processing portion, and has a data I/O portion 308, a data communication control portion 309, an operation portion 11, a control unit 311, a storage portion 312, an image memory 313, and a display 12. In the information processing portion 301, a control, such as a deletion or output of a job stored in the image memory 313 can be performed.

The control unit 311 has, e.g., a CPU 3111 and a RAM 3112. A data I/O portion 308 is connected to the control unit 311 so as to input and output a job.

This control unit 311 controls the entire MFP 1, and has the following functions in this embodiment.

That is, it functions as a detection portion 311a which detects that a USB memory 320 (321) (322) is connected to the USB port 20 (21) and (22) and/or that the connection state is released (pulled out of the insertion port).

It functions as a judging portion 311b which judges, e.g., whether, at the time of connecting any one of USB memories 320 (321) (322), stored information is to be read from a connected USB memory 320 (321) (322), or a processing wait job is to be written in the USB memory 320 (321) (322).

Furthermore, the control unit 311 functions as a display control portion 311c for performing a display control when processing wait jobs are displayed as a list.

It also functions as a job administration portion 311d which administers registration, deletion, etc., of a job read from another external equipments or a USB memory 320 (321) (322) and other jobs.

Furthermore, the control unit 311 also has a function of the timer portion 311e which measures the time in order to discriminate whether the state that setting required for executing a job was not made has passed for a certain period of time.

Concrete operations of each function by the aforementioned control units 311 will be mentioned later.

The data I/O portion 308 is provided with a plurality of interface (I/F) terminals, such as a LAN (Local Area Network) terminal 315 of a TCP/IP base network, a USB terminal 316, a Centronics terminal 317, a serial interface terminal 318, and/or a JTAG terminal 319.

In the state in which the data I/O portion 308 is connected to the network terminal 315, the USB terminal 316, the Centronics terminal 317, the serial interface terminal 318, or the JTAG terminal 319, it becomes possible to perform reading, writing and deleting data by the control unit 311.

The storage portion 312 is comprised of a nonvolatile memory, such as a hard disk, and has the aforementioned exclusive storage area (box) 3120 for saving image data, etc.

The image memory 313 registers, based on an instruction of the job administration portion 311d of the control unit 311, a job about an image data read from the USB memory 320 (321) (322), a job transmitted from the user PC 2, and a job inputted with the control panel 10.

The CPU 3111 makes the control unit 311 operate so that the aforementioned control and function an be demonstrated, and executes the program stored in the program storing portion (not shown) to operate the control unit 311. The RAM 3112 serves as a working area when the CPU 3111 performs a program.

In this embodiment, as mentioned above, there are a plurality of insertion ports as USB terminals 316 to which USB memories 320, 321 and 322 can be simultaneously connected. The control unit 311 can simultaneously perform the reading of each storage information to these plural USB memories 320, 321 and 322 and the writing of information to each USB memory 320, 321 and 322. The reading of storage information is performed by a data reading portion 311g of the control unit 311, and the writing of information is performed by a data writing portion 311h.

[Control Panel]

Figure 4:
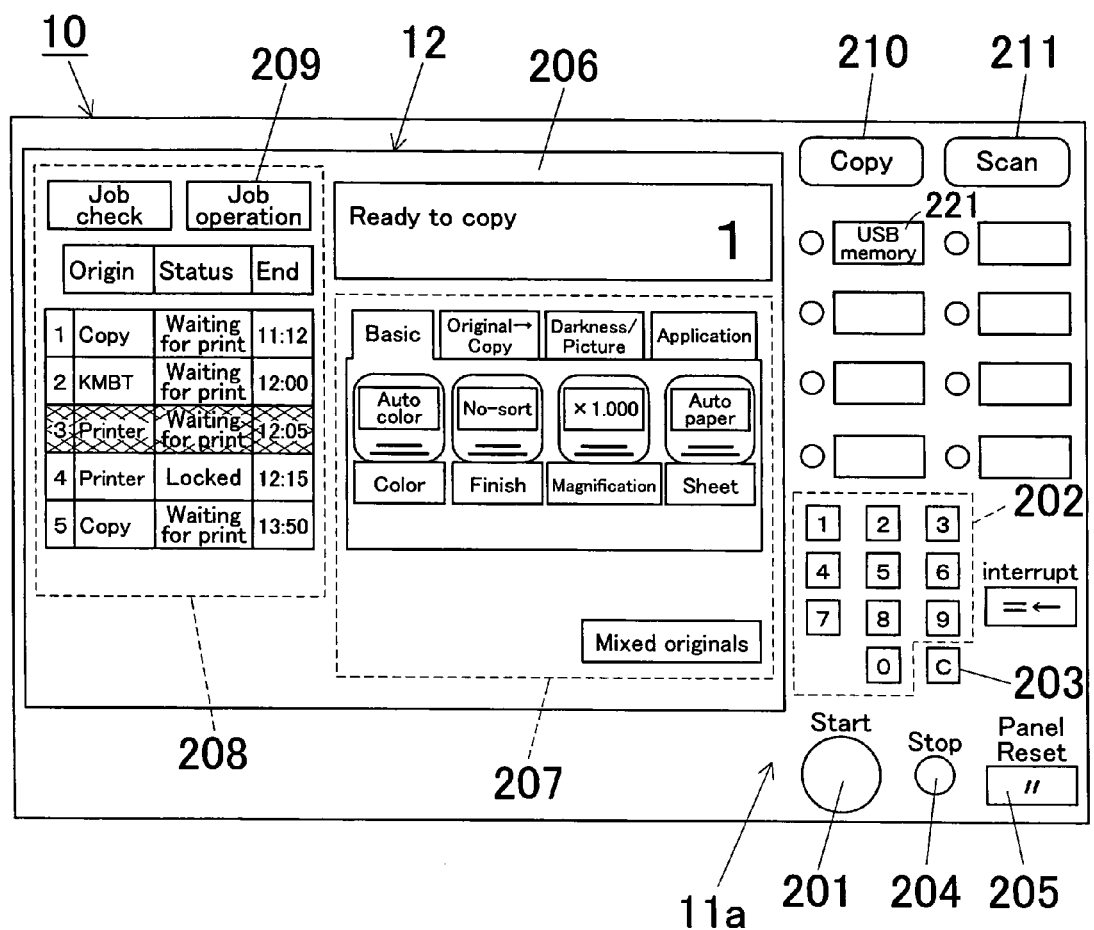
FIG. 4 is an explanatory drawing showing a display screen of a control panel.

FIG. 4 is a plan view showing a structure of the control panel 10 in the MFP 1.

In FIG. 4, the start key 201 is used to initiate the operation of a copy/facsimile transmission, etc. The ten key 202 is used to input numeric values, such as the number of copies to be made. The clear key 203 is used to clear the inputted numerals and delete accumulated image data of the image storage portion.

The stop key 204 is used to instruct suspension of copy/scan operations. The Panel Reset key 205 is used to cancel the set mode and job.

The display 12 displays various modes and is provided with the touch panel 206 on the surface thereof. With this touch panel 206, a user can perform various settings according to the display contents in the display 12. For example, when the setting screen of the user ID which is a user's identification information is displayed on the display 12, a user sets up the user ID using the various keys of the operation portion 11 and/or the touch button displayed on the display 12.

In the setting screen area 207 in the touch panel 206, usually, buttons for fundamental/applied settings for executing copy operations and/or facsimile send operations are arranged. When each button is touched, the hierarchy screen for performing the detailed settings will be displayed.

The job information screen area 208 of the touch panel 206 displays the current processing wait job information given to the MFP 1. The information is displayed in the order to be executed. The job about stored information of the USB memory is different from other jobs in display. FIG. 4 shows that the job No. 3 with hatched lines is the job about stored information of the USB memory. The different display can be made by changing color or reversing characters, but not limited to these. In the case of deleting, changing, etc., a specific job, after the selection of the job manual operation button 209, the job number button to be operated is pressed. A job operation screen is displayed in accordance with the operations, and therefore it becomes ready to operate the specific job.

The copy key 210 and the scanning key 211 are selection keys for setting which of the copy mode or the scanner mode is to be selected to operate the MFP 1.

When the copy key 210 is pressed, the MFP 1 becomes ready to use as a copy machine. A scanning operation and facsimile send action cannot be performed in this state.

At this time, a display for performing various settings with respect to copy operations appears in the setting screen area 207 of the touch panel 206. A copy operation is initiated by setting an original document and pressing the start key 201 after the completion of various settings. When the scanning key 211 is pressed, the MFP 1 will be served as a scanner and facsimile. A copy operation cannot be performed in this state.

At this time, in the setting screen area 207 of the touch panel 206, various settings regarding the scanning operation/facsimile transmission is displayed. A scanning operation/facsimile send action is initiated by setting an original document and pressing the start key 201 after the completion of various settings.

The copy key 210 and the scanning key 211 serve as an exclusive operation, and if one of them is selected, another will be in a non-selected state automatically.

When a printing operation is to be performed using the MFP 1 from the PC 2, a printer control driver software is installed in the PC 2, and various settings for the printing operation is performed on a driver screen. Accordingly, it is not required to display any setting screen for printing and any print change keys on the control panel 10 of the MFP 1.

In FIG. 4, the reference numeral 221 denotes a display portion displayed when equipped with a USB memory.

[Control Panel (In Cases where a Job Mode is not Set in a USB Memory)]

In this embodiment, if any one of USB memories 320, 321 and 322 is connected to any one of USB ports 20, 21 and 22, the stored information of the USB memory and the information set regarding the job mode will be read automatically, and will be registered into the image memory 313.

However, in cases where only image data is stored in the USB memory and no job mode is set, it is configured such that only image data is read and a user can set up the job mode on the control panel 10 of MFP 1.

Figure 5:
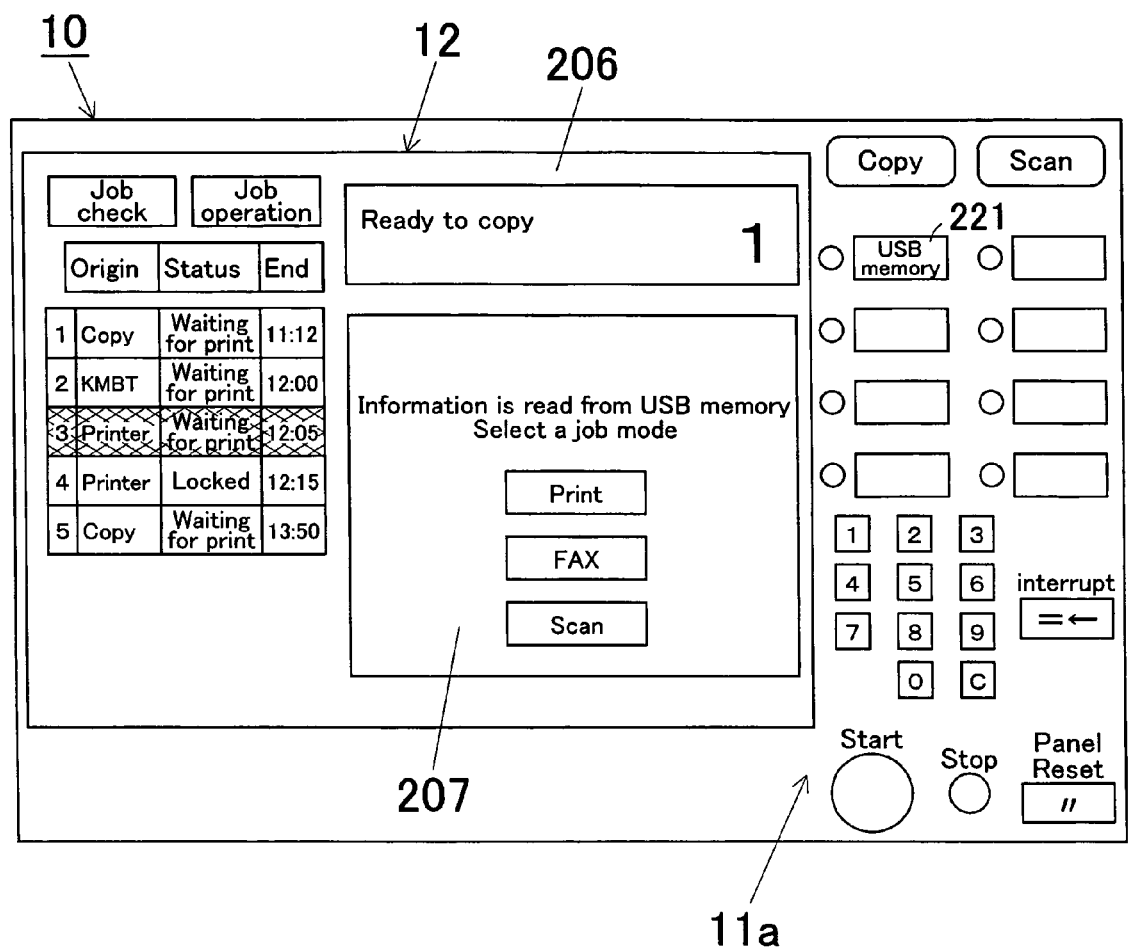
FIG. 5 shows a user confirmation screen at the time of reading the storage information in the external storage.

FIG. 5 shows a screen to be displayed when a user sets up a job mode. In cases where no job mode is set in the stored information read from the USB memory 320, 321 and 322, the screen shown in FIG. 5 is displayed so that a user can select a print, a facsimile or a scan.

When a printing mode or a facsimile mode is selected, the screen will change and detailed setting screen for specifying the number of copies and a destination will be displayed. After a completion of a job mode setting by a user, the control unit 311 registers as a job.

On the other hand, if a scanning mode is selected in FIG. 5, a display which instructs a use to set an original document on the feeder portion 17 and then press the start button. When the setting of the original document and the operation of the start button are completed, the set original document will be read and written in the USB memory.

[Control Processing at the Time of Connection of a USB Memory]

Next, the processing that the control unit 311 performs when, for example, a USB memory 320 among three USB memories is connected to a USB port 20 among three USB ports by inserting therein will be explained with reference to flowcharts. In the following explanation and drawings, a step will be abbreviated as "S."

Figure 6:
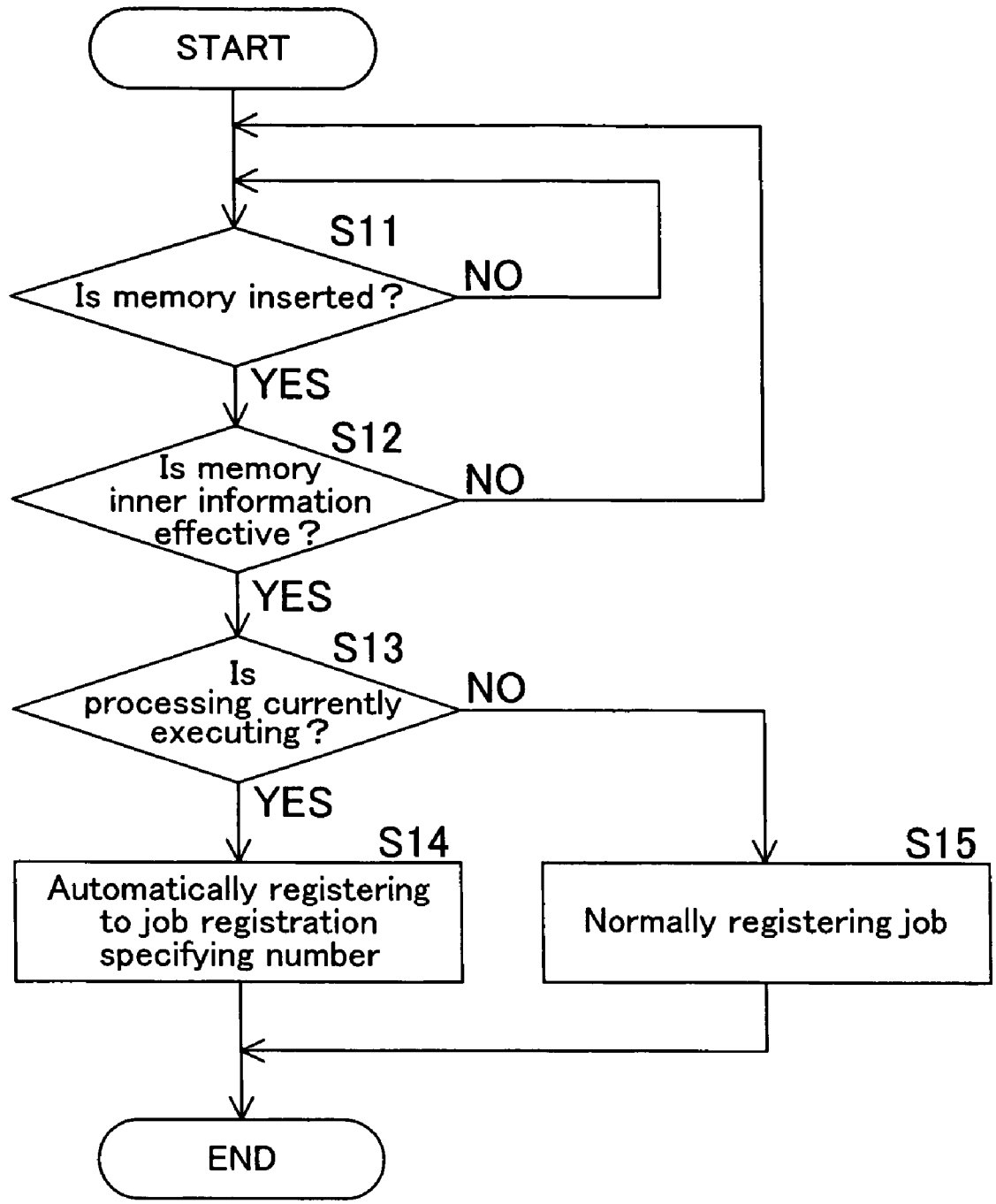
FIG. 6 is a flowchart showing control processing to be executed at the time of registering a job about stored information of an external storage as a processing wait job.

FIG. 6 shows a case in which the job about the stored information in the USB memory 320 is registered automatically as a processing wait job according to the job registration specifying number. In the image memory 313 of the MFP 1, other than image data, job mode information, such as setup conditions including the number of prints and concentration, and a job registration specifying number are stored. These image data, etc. may be inputted in the USB memory from the user PC 2, or may be image data of an original scanned with the MFP 1 inputted together with job mode information such as the number of prints and the concentration set on the control panel 10.

At S11, the control unit 311 discriminates whether the USB memory 320 is connected to the USB port 20. If it is discriminated that the USB memory 320 is connected to (mounted in) the USB port 20, the connection is detected by the controlling portion 311 via the data I/O portion 308 and the data communication control portion 309. If the connection is detected ("Yes" at S11), the control unit 311 reads the stored information in the USB memory 320 at S12 via the USB terminal 316, the data I/O portion 308 and the data communication control portion 309, and then it is discriminated whether the stored information in the USB memory 320 is effective.

Whether the information is effective will be discriminated by a method in which, for example, a mark is attached to certain information to be processed by the MFP 1 as a job among the stored information in the USB memory in advance, the stored information with the mark is read with the MFP 1 to check the mark. This mark will be deleted after the job registration.

If it is discriminated that the stored information is not effective ("No" at S12), the routine returns to S11. In cases where it is discriminated that the stored information is effective ("Yes" at S12), the routine proceeds to S13, and the MFP 1 discriminates whether the job is currently being processed. If the job is being executed ("Yes" at S13), in accordance with the job registration specifying number based on the stored information in the read USB memory 320, the image data, print set conditions, etc., are stored automatically to the image memory 313 in the MEFP 1. That is, it is registered as a processing wait job. The registered job will be executed in the previously set job mode at the execution timing.

If the job is not being processed ("No" at S13), the routine proceeds to S15, and the image data, print setting conditions, etc., will be automatically stored in the image memory 313 as a normal job. As for print setting conditions, etc., it is also possible for a user to select and set the conditions in advance other than information in the USB memory 320.

In the embodiment shown in FIG. 6, when a USB memory is connected to a USB port, the stored information in the USB memory will be read automatically, and the read job will be automatically registered as a processing wait job when the MFP 1 is executing another job. Thus, even if the MFP 1 is executing another job, the read job can be registered as a processing wait job without requiring complicated operations.

Figure 7:
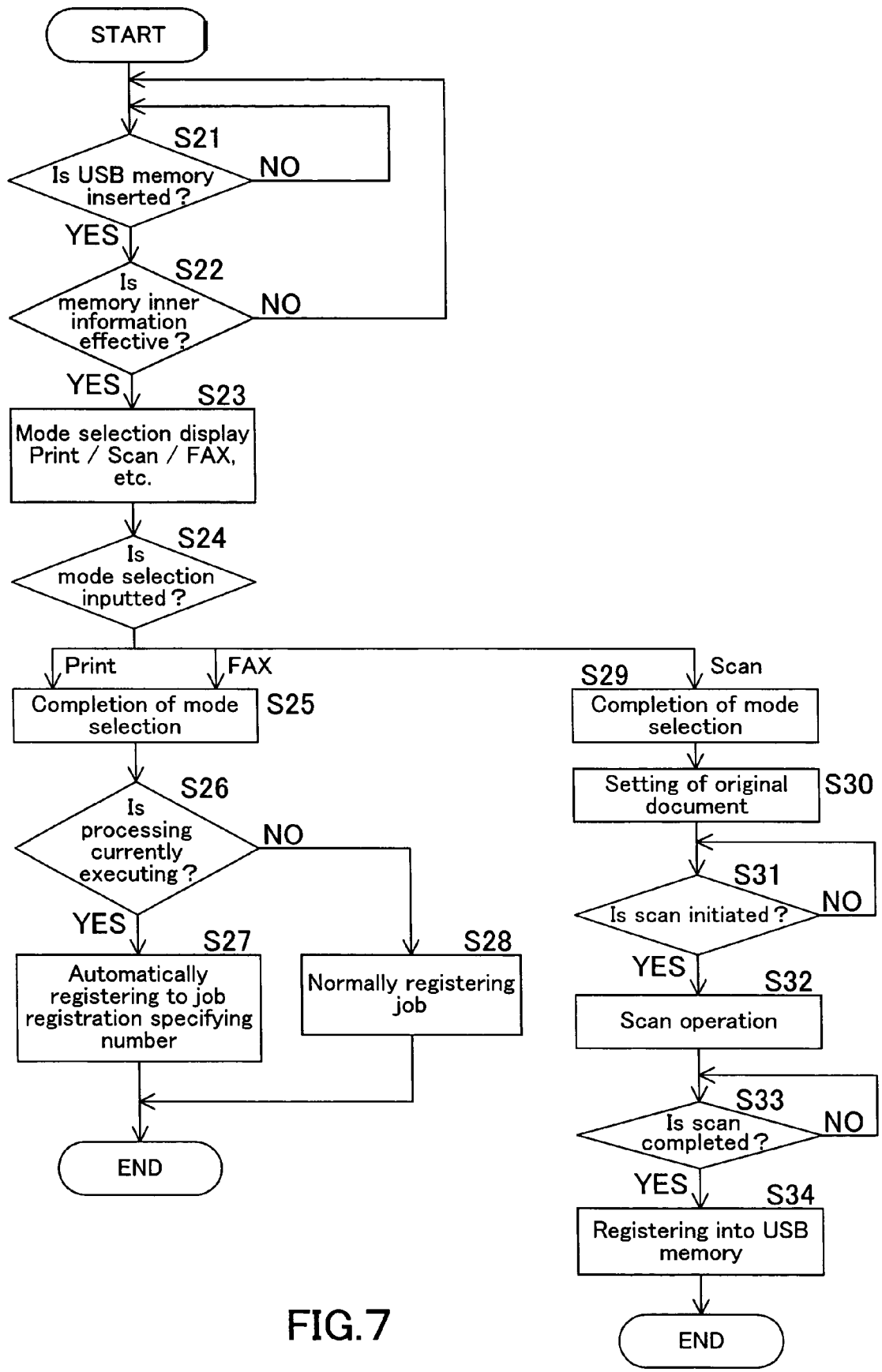
FIG. 7 is a flowchart showing another example of control processing to be executed at the time of registering a job about stored information of an external storage as a processing wait job.

FIG. 7 is a flowchart showing an example of processing to be executed in cases where the stored information of the USB memory contains only the image data and does not contain information about a job mode, and a job mode is set at MFP 1 and registered as a processing wait job.

At S21, the control unit 311 discriminates whether the USB memory 320 is connected to the USB port 20. If a connection is detected ("Yes" at S21), at S22, the control unit 311 reads the stored information in the USB memory 320 via the USB terminal 316, the data I/O portion 308 and the data communication control portion 309, and discriminates whether the stored information in the USB memory 320 is effective.

If it is discriminated that it is not effective ("No" at S22), the routine returns to S21. If it is discriminated that stored information is effective ("Yes" at S22), the routine proceeds to S23, and the selection display of print/scan/facsimile (FAX) is performed for the setting of a job mode on the display 12.

Subsequently, when, at S24, any one of modes is selected by the user, and detail mode settings, such as print setting conditions or transmitting settings, etc., are made, this mode selection and settings are inputted by the operation portion 11, and the mode is determined (stored) at S25 and S29.

If a printing mode or a facsimile mode is decided (at S25), at S26, it is checked whether the MFP 1 is in a job processing. If it is confirmed that the MFP 1 is performing job processing ("Yes" at S26), at S27, based on the read stored information in the USB memory 320, the image data and the set job mode are automatically stored in the image memory 313 within the MFP 1 according to a job registration specifying number. That is, they are registered as a processing wait job.

To the contrary, if the MFP 1 is not executing a job ("No" at S26), at S28, image data, job mode, etc., are automatically stored in the image memory 313 as a normal job.

On the other hand, if a scanning mode is set (S29), after setting an original document to the feeder portion 17 of the scanner portion 13 at S30, the routine waits for a scanning start instruction from a user at S31. When a scanning start is instructed ("Yes" at S31), at S32, the original document is scanned.

At S33, the routine waits that the scanning is completed. When the scanning is completed ("Yes" at S33), at S34, the scanned image data is written in the USB memory 320 to be registered.

In the embodiment shown in FIG. 7, even if no job mode is stored in a USB memory, a job mode can be determined by the MFP 1. Although a print facsimile and a scan are exemplified as job modes, an e-mail transmission such as an E-mail can also be applied.

Figure 8:
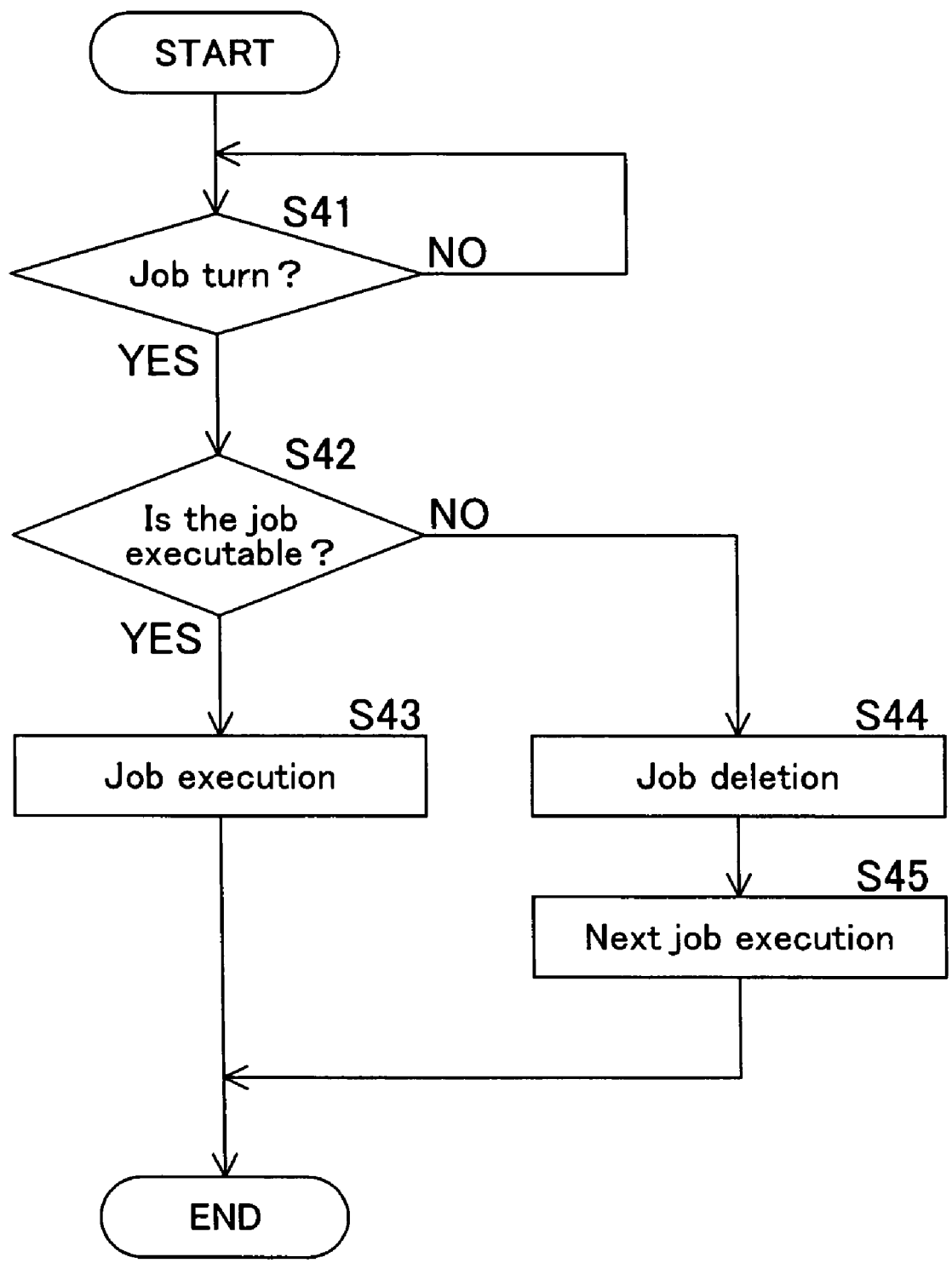
FIG. 8 is a flowchart showing an example of processing to be executed when execution timing of a job about stored information of a USB memory registered as a processing wait job arrives.

FIG. 8 is a flowchart showing an example of processing be executed when execution timing of a job about the stored information of the USB memory registered as a processing wait job arrives.

In the image memory 313 in the MFP 1, a job registration number is also stored together with image data, print setting conditions, etc.

At S41, it is discriminated about the job on the stored information of the USB memory whether execution timing came. If it is discriminated that the execution timing came (execution became available), at S42, it is discriminated whether a job is in an executable state. If it is in an executable state ("Yes" at S42), at S43, the job is executed at S43. In cases where a job is not in an executable state, e.g., no job mode is set ("No" at S42), at S44, the job is detected, and then at S45 the next job processing will be performed. It is also possible as processing when it is discriminated that a job is not in an executable state to postpone the job so as to be executed after the subsequent job processing.

In the embodiment shown in FIG. 8, in cases where a job about stored information of the USB memory cannot be executed when execution timing comes, a subsequent job will be executed. This can prevent that it becomes impossible to execute subsequent processing wait jobs due to the job about the stored information.

Figure 9:
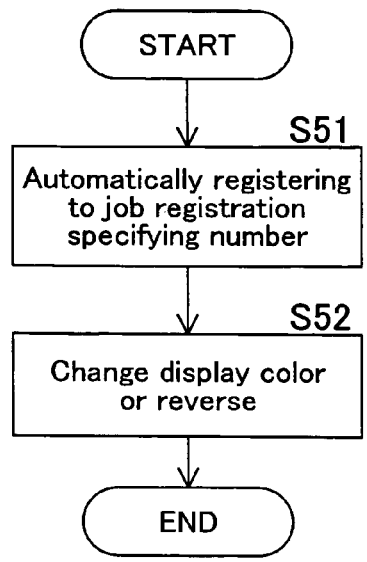
FIG. 9 is a flowchart showing an example of a display of a job about stored information of a USB memory registered as a processing wait job.

FIG. 9 is a flowchart showing an example of a display of a job about stored information of a USB memory registered as a processing wait job.

At S51, the job about the stored information of the USB memory is registered to a job registration specifying number. At the same time, at S52, the list of processing wait jobs is displayed on the job information screen area 208 with a color or a reversed character, etc., which is different from other jobs, so that the job can be identified. Thus, a user can recognize at a glance that it is a job about the stored information of the USB memory.

Figure 10:
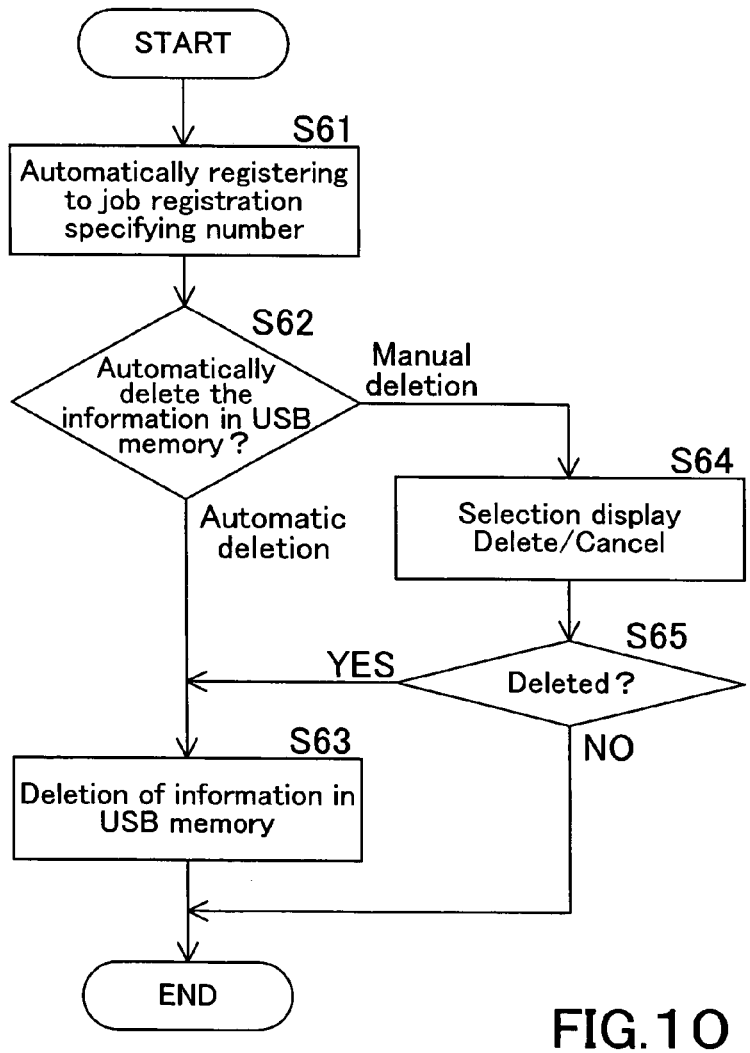
FIG. 10 is a flowchart showing an example of processing which deletes stored information in a USB memory after registering a job about stored information of a USB memory as a processing wait job.

FIG. 10 is a flowchart showing an example of processing which deletes the stored information in the USB memory 320 after registering the job about the stored information of the USB memory as a processing wait job.

After registering the job about the stored information of the USB memory to a job registration specifying number at S61, it is discriminated whether the stored information in the USB memory 320 is subjected to automatic delete processing or manual delete processing at S62.

In the case of automatic delete processing, the routine proceeds to S63, and the stored information corresponding to the job in the USB memory 320 is automatically deleted via the data communication control portion 309, the data I/O portion 308 and the USB terminal 316.

In the case of manual delete processing, at S64, whether the stored information in the USB memory 320 is deleted is displayed on the display 12, and then it is discriminated whether deletion was selected by the user at S65.

If deletion is selected ("Yes" at S65), the routine proceeds to S63, and the stored information corresponding to the job in the USB memory 320 is deleted. To the contrary, if non-deletion (cancellation) is selected ("No" at S65), the processing is terminated as it is.

In the embodiment shown in FIG. 10, if registered as a job about the stored information of USB memory, since the corresponding stored information in USB memory becomes unnecessary, it can prevent reduction of the storable capacity of the USB memory by automatic deletion. If it deletes unconditionally, the stored information which a user wants to save will also be deleted. Therefore, user's convenience can be secured by enabling deletion selection by manual operation.

Figure 11:
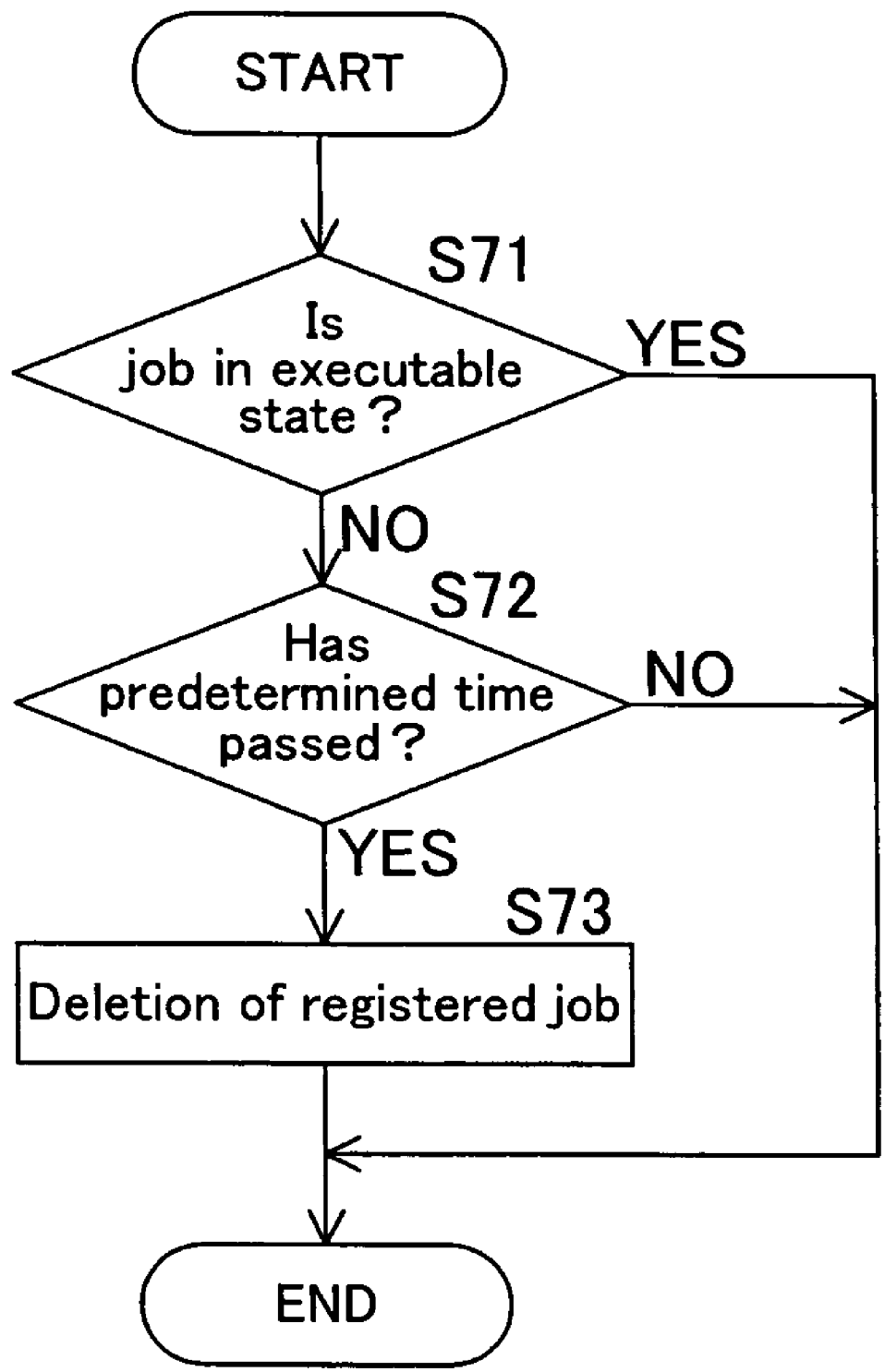
FIG. 11 is a flowchart showing an example of processing in the case of deleting a job about stored information of a USB memory registered as a processing wait job.

FIG. 11 is a flowchart showing an example of processing to be executed in the case of deleting a job about stored information of a USB memory registered as a processing wait job.

At S71, it is discriminated whether a job is in an executable state. If it is not in an executable state ("No" at S71), the passage of time is supervised at S72. When a certain period of time has passed ("Yes" at S72), the registered job is deleted at S73. This can prevent that the job remains as unprocessed for a long time.

If it is in an executable state at S71 ("Yes" at S71) and the certain time has not passed at S72 ("No" at S72), the processing is terminated, and the job is held as it is.

Figure 12:
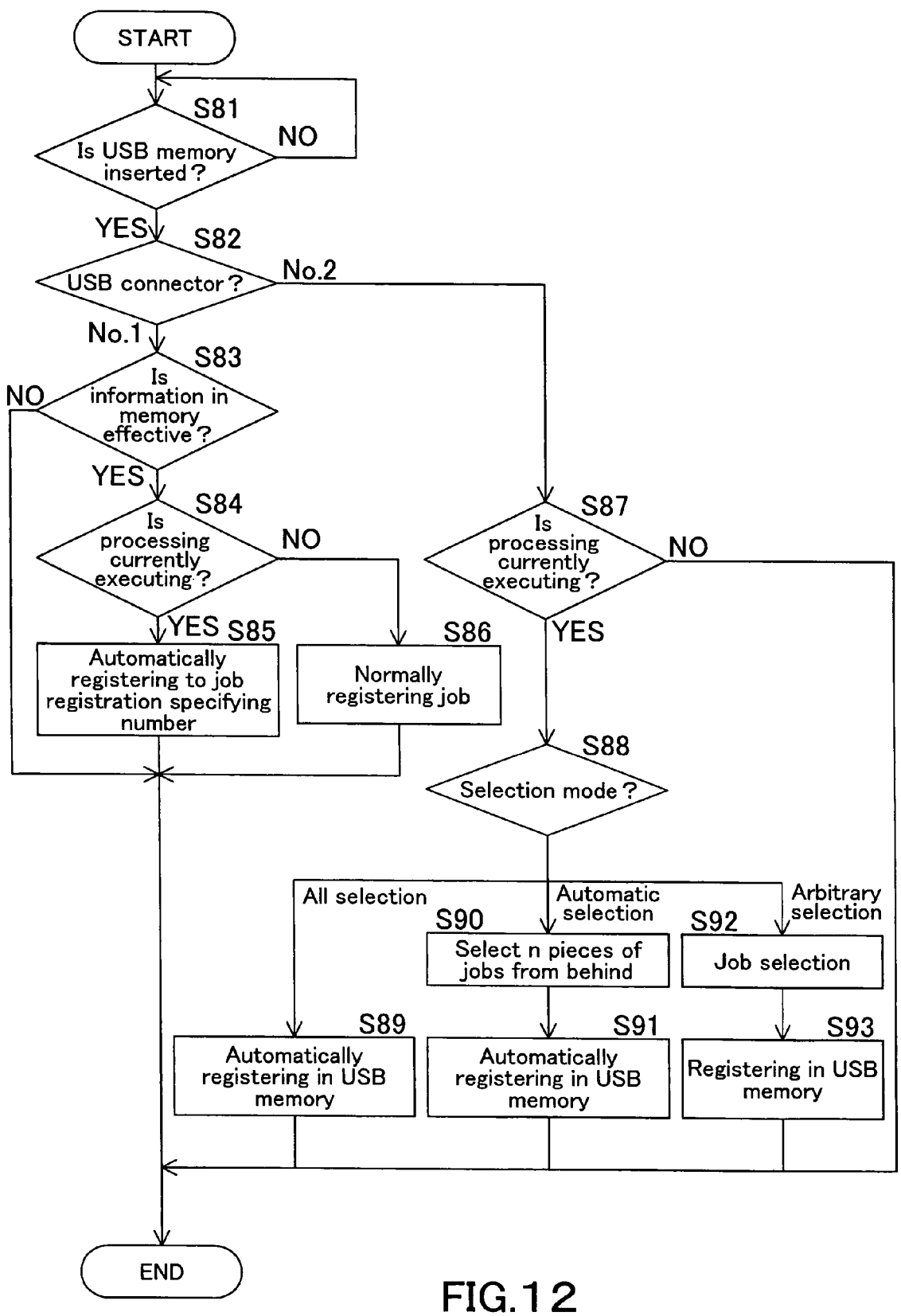
FIG. 12 is a flowchart showing processing in the case where a MFP has a storage function of reading and storing contents of a processing wait job in a USB memory.

FIG. 12 is a flowchart showing processing to be executed in cases where the MFP1 has a storage function for writing and saving contents of a processing wait job in MFP1 in the USB memory 320.

In this example, a function of reading stored information from a USB memory, and a function of writing in and registering a processing wait job of the MFP 1 into the USB memory are assigned in advance to every USB port (USB connector). Here, it is assumed that a stored information reading function from a USB memory is assigned to a first USB port 20, and a function of writing a processing wait job to a USB memory is assigned to a second USB port 21.

At S81, the control unit 311 discriminates whether the USB memory 320 is connected to the USB port 20. If connection was detected ("Yes" at S81), at S82, it is discriminated whether what is connected by the USB memory is a first USB memory insertion port 20 or a second USB memory insertion port 21. If it is the first USB memory insertion port 20, the routine proceeds to S83, and if it is the second USB memory insertion port 21, it proceeds to S87.

At S83, the control unit 311 reads the stored information in the USB memory 320 via the USB terminal 316, the data I/O portion 308 and the data communication control portion 309, and it is discriminated whether the stored information in the USB memory 320 is effective.

If it is discriminated that it is not effective ("No" at S83), the processing is terminated. If it is discriminated that the stored information is effective ("Yes" at S83), the routine proceeds to S84 to check whether the MFP 1 is currently executing a job.

If it is currently executing ("Yes" at S84), based on the read stored information in the USB memory 320, image data, print setting conditions, etc., are stored automatically in the image memory 313 in the MEFP 1 according to the job registration specifying number. That is, it registers as a processing wait job.

If it is not currently executing a job ("No" at S84), the routine proceeds to S86 to automatically store image data, print setting conditions, etc., in an image memory 313 as a normal job.

On the other hand, at S87, it is discriminated whether the MFP 1 is currently executing a job. If not ("No" at S87), since no processing wait job exists, the processing is terminated as it is. If it is executing ("Yes" at S87), since a processing wait job exists, the routine proceeds to S88 to discriminate the setting of the selection mode of the processing wait job. The setting of the selection mode of the processing wait job can be determined in advance, or can be set by a user by displaying the setting screen for selection modes on the display 12.

If all processing wait jobs are selected, the routine proceeds to S89, and all processing wait jobs are automatically written in the USB memory 321 connected to the second USB port 21 to be registered therein.

If automatic selection is set, at S90, n pieces of processing wait jobs from behind is automatically selected, and then the selected jobs are written in the USB memory 321 to be registered at S91.

If arbitrary option is set, after displaying a selection screen on the display 12 at S92 and making a user select, the selected processing wait jobs are written in the USB memory 321 at S93 to be registered.

In the embodiment shown in the flowchart of FIG. 12, since all or a part of processing wait jobs can be written and registered in a USB memory, this USB memory can be connected to USB ports of another MFP, and the registered job can be executed by the another MFP. Accordingly, in cases where many processing wait jobs exist, or a job execution portion breaks down and job processing is piled up, earlier processing by another MFP, etc., can be attained.

In the embodiment shown in FIG. 12, in advance, the first USB port 20 is assigned for the reading of stored information, and the second USB port 21 is assigned for the writing of a processing wait job. However, in any USB ports, it can be configured to set such that writing can be performed by a user's instruction, and a method of setting is not limited.

As for a selection of a processing wait job written in a USB memory, it can be configured such that a user can specify, or two jobs from behind in processing order can be selected among a plurality of jobs, or a job with larger number of prints can be selected. A method of selection is not limited.

Although USB memories are exemplified as external storages 320 to 322 in the aforementioned embodiment, an external storage, such as a portability hard disk drive unit, an optical disk and a memory card, can also be applicable.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology. "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An image forming apparatus, comprising:
   a job execution portion;
   a connecting portion configured to detachably connect to an external storage;
   a detection portion configured to detect a connection of the external storage to the connecting portion;
   a stored information reading portion configured to read information stored in the external storage based on the connection detection of the external storage by the detection portion;
   an internal storage portion configured to store the information read from the external storage as a processing wait job when the job execution portion is executing another job and configured to store the information read from the external storage as a normal job when the job execution portion is not executing another job in response to the information being read by the stored information reading portion, wherein the stored information in the internal storage portion includes image data to be processed by the job execution portion; and
   a job administration portion configured to automatically register the information read from the external storage as the normal job and control the job execution portion to execute the normal job when the job execution portion is not executing another job and configured to automatically register the information read from the external storage as the processing wait job without executing the processing wait job when the job execution portion is executing another job.

2. The image forming apparatus as recited in claim 1, further comprising:
   a mode setting portion configured to set a mode of the job for the stored information,
   wherein the job administration portion registers the job for the stored information in a processing wait job list in the set mode.

3. The image forming apparatus as recited in claim 1, wherein, in cases where setting required for execution of a first job for a first stored information registered as a processing wait job is not made when execution timing of the first job comes, the job administration portion controls the job execution portion to execute a subsequent second job for a second stored information registered as a processing wait job without executing the first job.

4. The image forming apparatus as recited in claim 1, further comprising:
   a display portion configured to display the processing wait job as a list; and
   a controller configured to make a display of the job for the stored information different from a display of another job in the list.

5. The image forming apparatus as recited in claim 1, wherein, when the job for the stored information is registered as the processing wait job, the job administration portion automatically deletes corresponding stored information stored in the external storage based on a deletion instruction by a user.

6. The image forming apparatus as recited in claim 1, wherein, when a state that no setting required for execution of the job for the stored information is made has continued for a certain period of time, the job administration portion deletes the job for the stored information.

7. The image forming apparatus as recited in claim 1, further comprising:
   a writing portion configured to write the stored information in the external storage connected to the connecting portion; and
   a discrimination portion configured to discriminate whether the stored information is read from the external storage connected to the connecting portion or the processing wait job is written to the external storage,
   wherein, based on a result from the discrimination portion, the job administration portion controls the reading portion to read the stored information from the external storage, or controls the writing portion to write the processing wait job to the external storage.

8. The image farming apparatus as recited in claim 7, wherein, in cases where a plurality of processing wait jobs to be written to the external storage by the writing portion exist, it is possible to select an arbitrary processing wait job.

9. The image forming apparatus as recited in claim 1, wherein the job execution portion is at least one of a print portion, a facsimile transmitting portion, and an e-mail transmitting portion.

10. The image forming apparatus as recited in claim 1, wherein the external storage is a USB memory.

11. A job execution apparatus, comprising:
    a job execution portion;
    a connecting portion configured to detachably connect to an external storage;
    a detection portion configured to detect a connection of the external storage to the connecting portion;
    a stored information reading portion configured to read information stored in the external storage based on the connection detection of the external storage by the detection portion;
    an internal storage portion configured to store the information read from the external storage as a processing wait job when the job execution portion is executing another job and configured to store the information read from the external storage as a normal job when the job execution portion is not executing another job in response to the information being read by the stored information reading portion, wherein the stored information in the internal storage portion includes image data to be processed by the job execution portion; and
    a job administration portion configured to automatically register the information read from the external storage as the normal job and control the job execution portion to execute the normal job when the job execution portion is not executing another job and configured to automatically register the information read from the external storage as the processing wait job without executing the processing wait job when the job execution portion is executing another job.

12. The job execution apparatus as recited in claim 11, wherein the external storage is a USB memory.

13. A job execution method, comprising:
   detecting a connection of an external storage to a connecting portion configured to detachably connect to the external storage;
   reading information stored in the external storage based on the connection detection of the external storage by the detecting step;
   storing the information read from the external storage in an internal storage portion as a processing wait job when a job execution portion is executing another job and configured to store the information read from the external storage as a normal job when the job execution portion is not executing another job in response to the information being read, wherein the stored information in the internal storage portion includes image data to be processed by the job execution portion;
   automatically registering the information read from the external storage as the normal job;
   executing the normal job when not executing another job; and
   automatically registering the information read from the external storage as a processing wait job without executing the processing wait job when another job is being executed in the executing step.

14. The job execution method as recited in claim 13, wherein the external storage is a USB memory.

15. The image forming apparatus as recited in claim 1, wherein the stored information reading portion is configured to read the information including image data and a job mode on image data processing from the external storage.

16. The image forming apparatus as recited in claim 1, wherein the job administration portion is configured to make the job execution portion execute the job for the stored information stored in the internal storage portion, register the job for the stored information as a processing wait job when the job execution portion is executing another job, and write job mode information on stored information processing together with the stored information to the external storage.

17. The job execution apparatus as recited in claim 11, wherein the stored information reading portion is configured to read the information including image data and a job mode on image data processing from the external storage.

18. The job execution apparatus as recited in claim 11, wherein the job administration portion is configured to make the job execution portion execute the job for the stored information as a processing wait job when the job execution portion is executing another job, and write job mode information on stored information processing together with the stored information to the external storage.

19. The image forming apparatus as recited in claim 1, further comprising:
   an accepting unit configured to accept a selection of a job mode from a user when the job mode is not set in the information read from the external storage, wherein the image forming apparatus has a print mode, a scan mode and a facsimile mode, and the accepting unit accepts the selection of one of the print mode, the scan mode and the facsimile mode.

20. The job execution apparatus as recited in claim 11, further comprising:
   an accepting unit configured to accept a selection of a job mode from a user when the job mode is not set in the information read from the external storage, wherein the job execution apparatus has a print mode, a scan mode and a facsimile mode, and the accepting unit accepts the selection of one of the print mode, the scan mode and the facsimile mode.

21. The job execution method as recited in claim 13, further comprising:
   accepting a selection of a job mode from a user when a job mode is not set in the information read from the external storage, the selection is one of a print mode, a scan mode and a facsimile mode.

* * * * *